US007009526B2

(12) United States Patent
Hughes et al.

(10) Patent No.: US 7,009,526 B2
(45) Date of Patent: Mar. 7, 2006

(54) RFID SYSTEM AND METHOD INCLUDING TAG ID COMPRESSION

(75) Inventors: Michael A. Hughes, Pasco, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 505 days.

(21) Appl. No.: 10/263,873

(22) Filed: Oct. 2, 2002

(65) Prior Publication Data
US 2004/0066279 A1   Apr. 8, 2004

(51) Int. Cl.
G08B 5/22 (2006.01)
G08B 23/00 (2006.01)
H04Q 5/22 (2006.01)

(52) U.S. Cl. .............................. 340/825.49; 340/10.4; 340/10.52; 340/573.3

(58) Field of Classification Search ............ 340/573.3, 340/825.49, 10.4, 825.31, 825.34, 10.5, 10.2, 340/10.3, 5.52; 235/492, 494; 455/41.1, 455/434
See application file for complete search history.

(56) References Cited

U.S. PATENT DOCUMENTS

| | | | |
|---|---|---|---|
| 4,075,632 A | 2/1978 | Baldwin et al. | 343/6.8 |
| 4,352,183 A | 9/1982 | Davis et al. | 371/33 |
| 4,360,810 A | 11/1982 | Landt | 343/6.5 |
| 5,530,702 A | 6/1996 | Palmer et al. | 370/85.3 |
| 5,550,547 A | 8/1996 | Chan et al. | 342/42 |
| 5,649,296 A | 7/1997 | MacLellan et al. | 455/38.2 |
| 5,757,923 A | 5/1998 | Koopman, Jr. | 380/46 |
| 5,777,561 A | 7/1998 | Chieu et al. | 340/825.54 |
| 5,850,187 A | 12/1998 | Carrender et al. | 340/10.6 |
| 5,883,582 A | 3/1999 | Bowers et al. | 340/825.54 |
| 5,940,006 A * | 8/1999 | MacLellan et al. | 340/10.1 |
| 5,986,570 A | 11/1999 | Black et al. | 340/825.54 |
| 5,995,019 A | 11/1999 | Chieu et al. | 340/825.54 |
| 6,061,344 A * | 5/2000 | Wood, Jr. | 370/346 |
| 6,091,319 A | 7/2000 | Black et al. | 340/10.2 |
| 6,130,623 A | 10/2000 | MacLellan et al. | 340/825.54 |
| 6,150,934 A * | 11/2000 | Stiglic | 340/505 |

(Continued)

FOREIGN PATENT DOCUMENTS

EP    1 168 230 A    1/2002

(Continued)

OTHER PUBLICATIONS

U.S. Appl. No. 09/589,001, filed Jun. 6, 2000, Gilbert et al.

(Continued)

*Primary Examiner*—Michael Horabik
*Assistant Examiner*—Nam Nguyen
(74) *Attorney, Agent, or Firm*—Wells St. John P.S.

(57) ABSTRACT

A method of rapidly identifying RFID tags in an RFID system including a reader and a plurality of RFID tags, the tags having respective IDs formed of a plurality of bit locations, the method comprising determining in the reader which bit locations do not add to the uniqueness of the IDs of the tags; and ignoring data in bit locations that do not add to the uniqueness of the IDs of the tags. An RFID system comprising a plurality of RFID tags, the tags having respective IDs formed of a plurality of bit locations; and an RFID reader configured to communicate with the RFID tags, the reader being configured to determine which bit locations do not add to the uniqueness of the IDs of the tags, and to ignore data in bit locations that do not add to the uniqueness of the IDs of the tags.

40 Claims, 4 Drawing Sheets

U.S. PATENT DOCUMENTS

| | | | |
|---|---|---|---|
| 6,177,858 B1 | 1/2001 | Raimbault et al. | 340/10.1 |
| 6,177,861 B1 | 1/2001 | MacLellan et al. | 340/10.1 |
| 6,236,315 B1 | 5/2001 | Helms et al. | 340/572.7 |
| 6,265,962 B1 | 7/2001 | Black et al. | 340/10.2 |
| 6,307,848 B1 | 10/2001 | Wood, Jr. | 370/329 |
| 6,366,260 B1 | 4/2002 | Carrender | 343/866 |
| 6,422,476 B1 * | 7/2002 | Ackley | 235/494 |
| 6,538,563 B1 * | 3/2003 | Heng | 340/10.2 |
| 2005/0083963 A1 | 4/2005 | Holeman, Sr. | 370/447 |

FOREIGN PATENT DOCUMENTS

| | | |
|---|---|---|
| GB | 2 340 692 A | 2/2000 |

OTHER PUBLICATIONS

U.S. Appl. No. 09/802,408, filed Mar. 9, 2001, Gilbert et al.
U.S. Appl. No. 09/833,465, filed Apr. 11, 2001, Carrender et al.
U.S. Appl. No. 09/588,997, filed Jun. 6, 2000, Gilbert et al.
U.S. Appl. No. 09/589,000, filed Jun. 6, 2000, Gilbert et al.
U.S. Appl. No. 09/588,998, filed Jun. 6, 2000, Carrender et al.
U.S. Appl. No. 09/797,539, filed Feb. 28, 2001, Carrender.
U.S. Appl. No. 09/833,391, filed Apr. 11, 2001, Carrender.
Finkenzeller, Klaus, "Radio-Frequency identification Fundamentals and Applications", *RFID Handbook*, Chapter 8, pp. 151-158 (Jan. 2002).
International Standard, ISD/IEC, "Part 2: Mechanisms Using Symmetry Encipherment Algorithems", *Information Technology—Security Techniques—Entity Authentication*#ISO/IEC 9798-2:1999(E), 2nd Ed., pp. 1-11 (Jul. 15, 1999).
Agilent Technologies, "Schottky Diode Voltage Doubler, Application Note 956-4", 2 pages (1999).
U.S. Patent Appn. filed Oct. 2, 2002, entitled "Radio Frequency Identification Device Communications Systems, Wireless Communication Devices, Wireless Communication Systems, Backscatter Communication Methods, RAdi Frequency Identification Device Communication Methods and a Radio Frequency Identification Device", by Michael A. Hughes and Richard M. Pratt.
U.S. Patent Appn. filed Oct. 2, 2002, entitled "Method of Simultaneously Reading Multiple RAdio Frequency Tags, RF Tag, and RF Reader", by Ertin, Richard M. Pratt, Michael A. Hughes, Kevin L. Priddy and Wayne M. Lechelt.
U.S. Patent Appn. filed Oct. 2, 2002, etntitled "System and Method to Identify Multiple RFID Tags", by Michael A. Hughes and Richard M. Pratt.
U.S. Patent Appn filed 10/2/2002, entitled "Radio Frequency Identification Devices, Backscatter Communication Device Wake-Up Methods, Communication Device Wake-Up Methods and a Radio Frequency Identification Device Wake-Up Method", by Richard M. Pratt and Michael A. Hughes.
U.S. Patent Appn. filed Oct. 2, 2002, entitled "Wireless Communication Systems, RAdio Frequency Identification Devices, Methods of Enhancing a Communications Range of a Radio Frequency Identification Device, and Wireless Communication Methods", by Richard M. Pratt and Steven B. Thompson.
U.S. Patent Appn. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.
U.S. Patent Appn. filed Oct. 2, 2002, entitled "A Challenge-Based Tag Authentication Model", by Michael A. Hughes and Richard M. Pratt.
PCT/US 03/26218, Jan. 14, 2004, PCT, (International Search Report).

* cited by examiner

RFID SYSTEM AND METHOD INCLUDING TAG ID COMPRESSION

GOVERNMENT RIGHTS

This invention was made with Government support under Contract 43213A awarded by the U.S. Department of the Navy. The Government has certain rights in the invention.

TECHNICAL FIELD

The invention relates to a remote communication system. More particularly, the invention relates to a radio frequency (RF) identification system and methods for rapidly identifying RF tags.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

Figure 1:
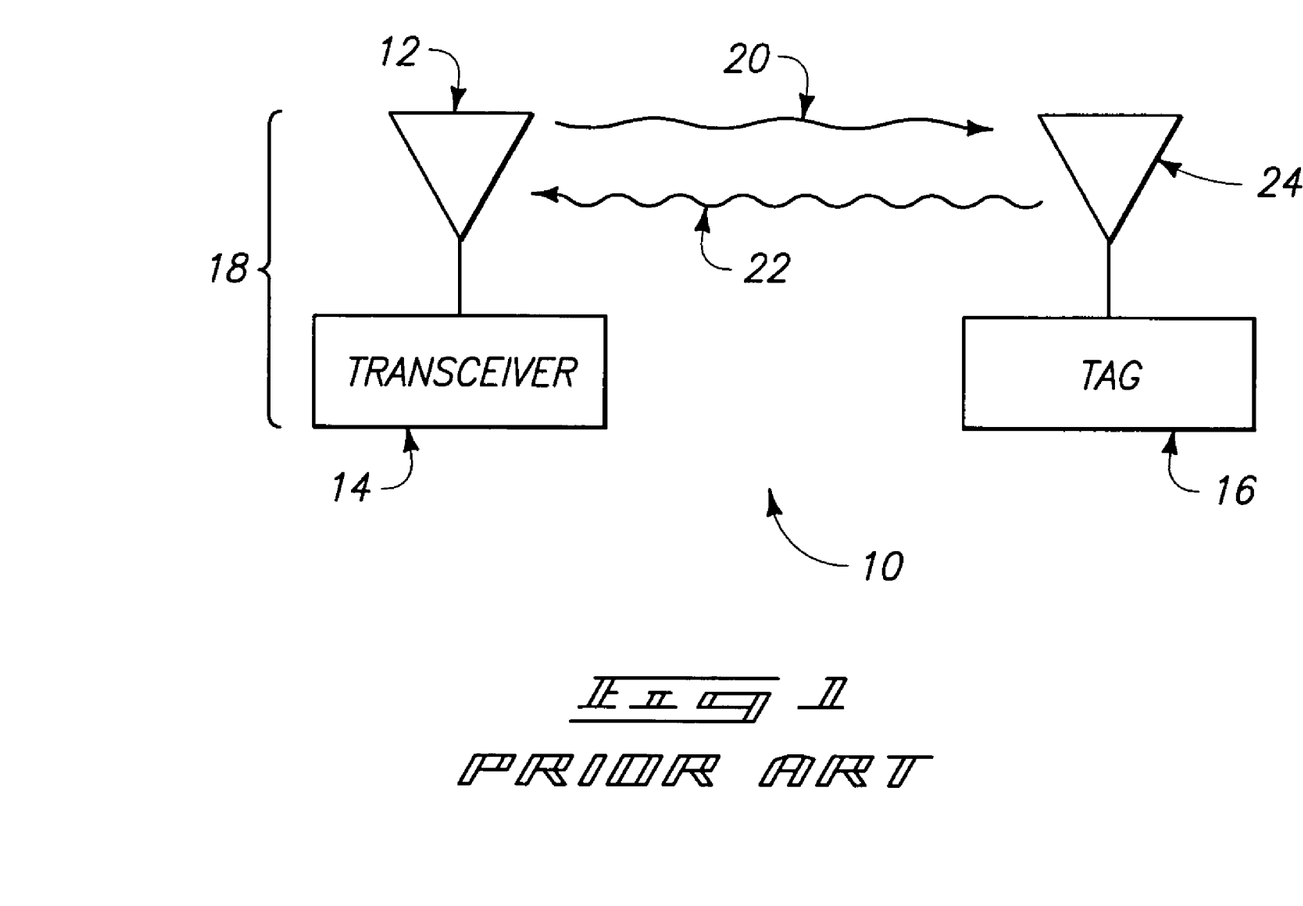
FIG. 1 is a block diagram of a conventional RFID communication system, including a tag and reader in which the invention could be incorporated.

RF identification (RFID) tag systems have been developed to identify, monitor, or control remote objects. As shown in FIG. 1, a basic RFID system 10 includes an interrogator 18 and transponders (commonly called RF tags) 16. The interrogator 18 includes a transceiver with decoder 14 and an antenna 12. The tag 16 includes an antenna 24. In operation, the antenna 12 emits and receives electromagnetic radio signals generated by the transceiver 14 to activate the tag 16, and receive signals from the tag. When the tag 16 is activated, data can be read from or written to the tag.

In some applications, the transceiver and antenna 12 are components of an interrogator (or reader) 18, which can be configured either as a hand-held or a fixed-mount device. The interrogator 18 emits the radio signals 20 in range from one inch to one hundred feet or more, depending upon its power output, the radio frequency used, and other radio frequency considerations. When an RF tag 16 passes through the electromagnetic radio waves 20, the tag detects the signal 20 and is activated. Data encoded in the tag 16 is then transmitted by a modulated data signal 22 through an antenna 24 to the interrogator 18 for subsequent processing.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than one hundred milliseconds.

There are three main categories of RFID tag systems. These are systems that employ beam-powered passive tags, battery-powered semi-passive tags, and active tags. Each operates in fundamentally different ways. The invention described below in the Detailed Description can be embodied in any of these types of systems.

The beam-powered RFID tag is often referred to as a passive device because it derives the energy needed for its operation from the radio frequency energy beamed at it. The tag rectifies the field and changes the reflective characteristics of the tag itself, creating a change in reflectivity (RF cross-section) that is seen at the interrogator. A battery-powered semi-passive RFID tag operates in a similar fashion, modulating its RF cross-section in order to change its reflectivity that is seen at the interrogator to develop a communication link. Here, the battery is the only source of the tag's operational power. Finally, in the active RFID tag, both the tag and reader have transceivers to communicate and are powered by a battery.

A typical RF tag system 10 will contain at least one tag 16 and one interrogator 18. The range of communication for such tags varies according to the transmission power of the interrogator 18 and the tag 16. Battery-powered tags operating at 2,450 MHz have traditionally been limited to less than ten meters in range. However, devices with sufficient power can reach in excess of 100 meters in range, depending on the frequency and environmental characteristics.

Conventional RF tag systems utilize continuous wave backscatter to communicate data from the tag 16 to the interrogator 18. More specifically, the interrogator 18 transmits a continuous-wave radio signal to the tag 16, which modulates the signal 20 using modulated backscattering wherein the electrical characteristics of the antenna 24 are altered by a modulating signal from the tag that reflects a modulated signal 22 back to the interrogator 18. The modulated signal 22 is encoded with information from the tag 16. The interrogator 18 then demodulates the modulated signal 22 and decodes the information.

Conventional continuous wave backscatter RF tag systems utilizing passive (no battery) RF tags require adequate power from the signal 20 to power the internal circuitry in the tag 16 used to modulate the signal back to the interrogator 18. While this is successful for tags that are located in close proximity to an interrogator, for example less than three meters, this may be insufficient range for some applications, for example greater than 100 meters.

A problem in RFID systems is in the rapid identification of an unknown number and identity of tags with long IDs in the field of view of the reader.

SUMMARY OF THE INVENTION

The invention provides a method of rapidly identifying RFID tags in an RFID system including a reader and a plurality of RFID tags, the tags having respective IDs formed of a plurality of bit locations, the method comprising determining in the reader which bit locations do not add to the uniqueness of the IDs of the tags; and ignoring data in bit locations that do not add to the uniqueness of the IDs of the tags.

Another aspect of the invention provides a method of compressing IDs of tags in an RFID system including a reader and a plurality of tags, different tags having different IDs, the IDs having a plurality of bits, the method comprising: (a) issuing from a reader a number n of sequential reads or timing pulses timing pulses (which could be, for example, the brief removal of RF illumination); (b) respective tags counting the reads and responding if bit n of their ID has a first value; (c) recording with the reader, bit locations at which a response was obtained; (d) issuing from the reader a number m of sequential reads or timing pulses; (e) respective tags counting the reads and responding if bit m of their ID has a second value different from the first value; (f) recording, with the reader, bit locations at which a response was obtained; (g) determining, in the reader, bit locations at which a response was received for both (c) and (f); and (h) sending a command from the reader to the tags to modify their IDs by shifting over bit locations other than those determined in (g).

Another aspect of the invention provides a method of rapidly identifying RFID tags in an RFID system including a reader and a plurality of RFID tags, the tags having respective IDs formed of a plurality of bit locations, the method comprising: (a) issuing from a reader a command indicating a group number y corresponding to a group of bits in the respective tags IDs, followed by sequential reads or timing pulses (timeslots); (b) respective tags counting the timeslots and responding in a timeslot corresponding to decimal equivalent of the value contained in group number y; (c) the reader recording the responses; and (d) issuing from the reader, commands requesting certain tags to change the values located in their group number y.

Another aspect of the invention provides an RFID system comprising: a plurality of RFID tags, the tags having respective IDs formed of a plurality of bit locations; and an RFID reader configured to communicate with the RFID tags, the reader being configured to determine which bit locations do not add to the uniqueness of the IDs of the tags, and to ignore data in bit locations that do not add to the uniqueness of the IDs of the tags.

Another aspect of the invention provides an RFID system comprising: a plurality of RFID tags, the tags having respective IDs formed of a plurality of bit locations; and an RFID reader configured to communicate with the RFID tags, the reader being configured to: (a) issue a number n of sequential reads or timing pulses; (b) record bit locations at which a response was obtained; (c) issue a number m of sequential reads; (d) record bit locations at which a response was obtained; and (e) determine bit locations at which a response was received for both (b) and (d); and the tags being configured to, during (a), count the reads and respond if bit n of their ID has a first value and configured to, during (c), count the reads and respond if bit m of their ID has a second value different from the first value.

Another aspect of the invention provides an RFID system comprising: a plurality of RFID tags, the tags having respective IDs formed of a plurality of bit locations; and a reader configured to communicate with the tags and configured to issue a command indicating a group number y corresponding to a group of bits in the respective tags IDs, followed by a number of timeslots; the tags being configured to count the timeslots and respond in a timeslot corresponding to decimal equivalent of the value contained in group number y; and the reader being further configured to record the responses; and issue commands requesting certain tags to change the values located in their group number y.

One aspect of the invention provides a method for rapidly identifying RFID tags in the field of view of the reader without any knowledge of the number or identity of the tags. The method uses a technique to generate a unique nickname for each tag from the tag's permanent ID number, and then identify the tag nicknames which are present.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Attention is directed to the following commonly assigned applications, which are incorporated herein by reference: U.S. Patent Application Ser. No. 10/263,826 entitled "Radio Frequency Identification Device Communications Systems, Wireless Communication Devices, Wireless Communication Systems, Backscatter Communication Methods, A Radio Frequency Identification Device and A Radio Frequency Identification Device Communication Method" by inventors. Mike A. Hughes and Richard M. Pratt; U.S. Patent Application Ser. No. 10/263,809, entitled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt; U.S. Patent Application Ser. No. 10/264,078, entitled "System and Method to Identify Multiple RFID Tags", by inventors Mike A. Hughes and Richard M. Pratt; U.S. Patent Application Ser. No. 10/263,940, entitled "Wireless Communication Devices, Radio Frequency Identification Devices, Backscatter Communication Device Wake-Up Methods, Communication Device Wake-Up Methods and A Radio Frequency Identification Device Wake-Up Method", by inventors Richard Pratt and Mike Hughes; U.S. Patent Application Ser. No. 10/263,997, entitled "Wireless Communication Systems, Radio Frequency Identification Devices, Methods of Enhancing a Communications Range of a Radio Frequency Identification Device, and Wireless Communication Methods", by inventors Richard Pratt and Steven B. Thompson; U.S. Patent Application Ser. No. 10/263,670, entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson U.S. Patent Application Ser. No. 10/263,656, entitled "Wireless Communications Systems, Radio Frequency Identification Devices, Wireless Communications Methods, and Radio Frequency Identification Device Communications Methods", by inventors Richard Pratt and Steven B. Thompson; U.S. Patent Application Ser. No. 10/263,635, entitled "A Challenged-Based Tag Authentication Model, by inventors Mike A. Hughes" and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender; U.S. patent application Ser. No. 09/588,998; filed Jun. 6, 2000, entitled "Distance/Ranging by Determination of RF Phase Delta", by inventor C. L.

Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

Figure 2:
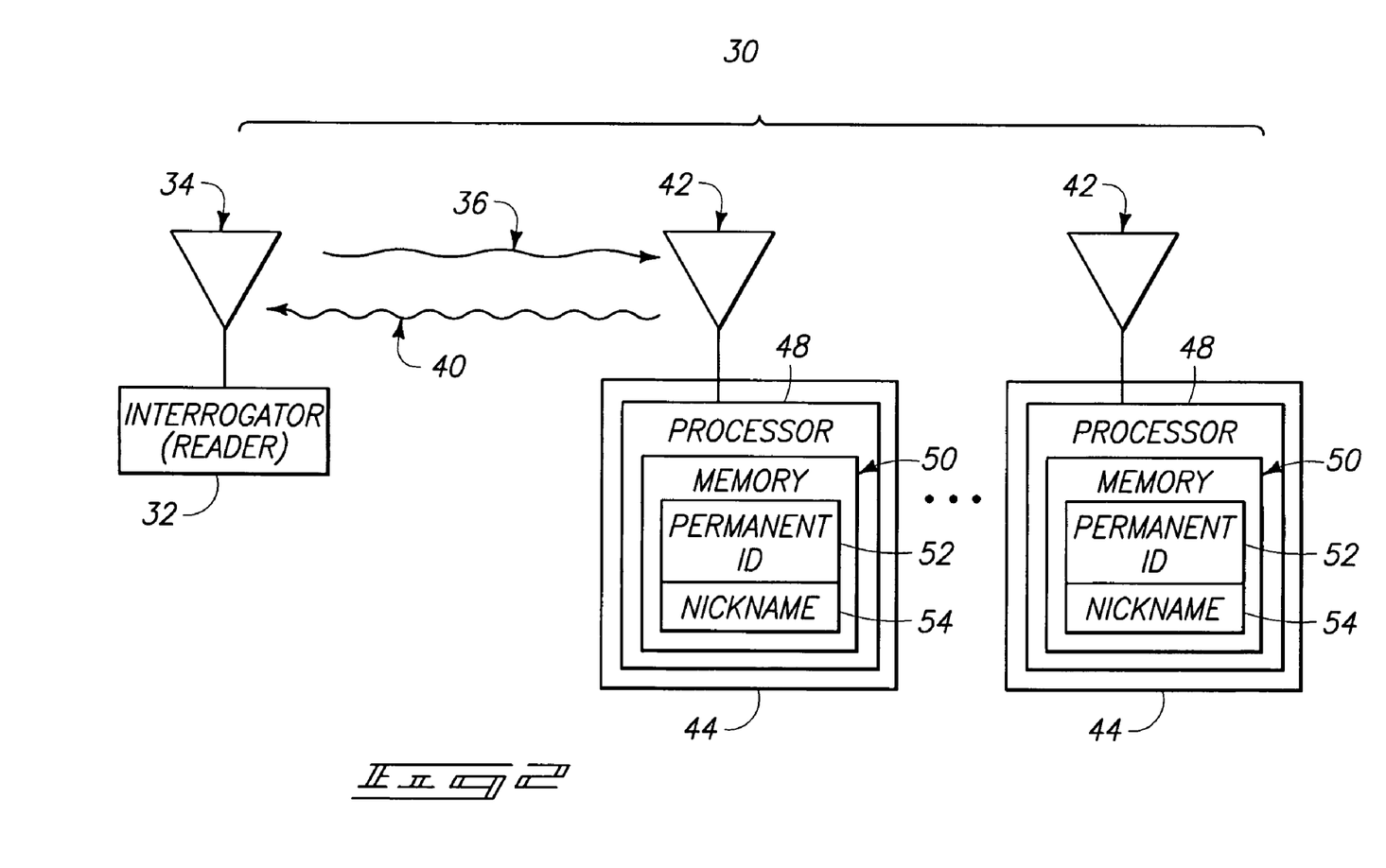
FIG. 2 is a block diagram of an RFID communication system, including a tag and reader, embodying various aspects of the invention.

As shown in FIG. 2, an embodiment of the present invention is directed to an RF communication system 30 that employs backscatter signals. The RF communication system 30 includes a reader or interrogator 32 that includes an antenna 34 through which the reader can transmit an interrogation signal 36 to an RF tag 44. The RF tag modulates the continuous wave interrogation signal 36 to produce a backscatter response signal 40 that is transmitted back to the interrogator 32. The signal 40 can include an identification code stored in memory 50, or other data. While FIG. 2 shows only two tags 44, there would typically be multiple tags 44 in use, capable of communicating with the reader 32.

The embodiment shown in FIG. 2, the RF tag 44 includes an antenna 42 coupled to a modulator defined by processor 48. The tag 44 includes a switch coupled between the antenna 42 and processor 48. In the embodiment of FIG. 2, the switch is included in the processor 48. Alternatively, the switch can be a switch external to the processor 48, such as an n-channel MOS transistor, a p-channel MOS transistor, a bi-polar transistor, or any of numerous other types of switches.

In FIG. 2, a modulating signal from the processor 48 is input to the antenna 42 to cause the antenna to alternately reflect or not reflect. One item that can be transmitted from the tag to the reader is an identification code that is stored in memory 50 of the RF tag 44. In one embodiment, after receiving a command, the reader sends a carrier wave or interrogation signal 36 that is received by the antenna 42, and that signal is selectively reflected or not reflected back by the antenna 42 by the tag 44 shorting or not shorting dipole halves of the antenna 42 to produce portions of the response signal 40 (backscatter communications). Other communication methods are possible.

It will be appreciated that the depiction of the RF tag 44 in FIG. 2 is one embodiment only; RFID tags are well-known in the art. For example, U.S. Pat. No. 4,075,632 to Baldwin et al., which is incorporated herein by reference, discusses in detail circuit structures that could be used to produce the RF tag 44, if modified as described below.

Similarly, the internal structures of the interrogator 32 are not shown in FIG. 2. For example, the interrogator 32 can be the receiver described in U.S. Pat. No. 4,360,810 to Landt, which is incorporated herein by reference, modified as described below.

Each tag includes a unique permanent ID and a modifiable nickname. The modifiable nickname is defined by or stored in memory locations 54 which can be volatile or non-volatile. The permanent ID is also defined by memory locations 52 (typically non-volatile memory) or could be defined by fusible links, for example. The memory can be separate from the processor 48 or can be included in the processor 48. Instead of including a permanent ID, each tag can include a memory holding two IDs, one which will be modified as described below, and another which will not be modified by the described processes.

One aspect of the invention provides a method of significantly increasing the speed of discovering (identifying) RF tags in the field of view of the reader. This technique is specifically designed to identify tags in a very large address space without prior knowledge of the tag's identity. The concept described below uses two techniques to reduce the length of the tag's permanent ID into a shorter, but unique nickname (alternate address) for each tag in the space. This nickname is then scanned during the final phase of the discover process to correlate the nickname to the tag's permanent ID.

This technique will work for tags of varying levels of sophistication. It does not require multiple IF frequencies or read-while-write capability. One of the elements of this technique is that it minimizes the amount of communication between the reader and the tags.

In one embodiment, the invention makes use of a method described in a commonly assigned application, attorney docket 13096-B (BA4-097), entitled "System and Method to Identify Multiple RFID Tags" naming as inventors Mike Hughes and Richard M. Pratt, that describes the use of TONEs to identify RF tags, that was filed on the same day as this application, and which is incorporated herein by reference. A TONE is any frequency or frequency pattern generated in the tag that the reader can recognize during a timeslot to determine that a tag is responding. A simple tag response is all that is required for the reader to gain information about a tag's identity—the tag does not need to present its entire ID.

In one embodiment, the process occurs in two phases, Phase 1 and Phase 2. The Phase 1 compression technique quickly identifies all tags with permanent ID numbers that have common bit patterns. This will be described in connection with FIG. 3.

Figure 3:
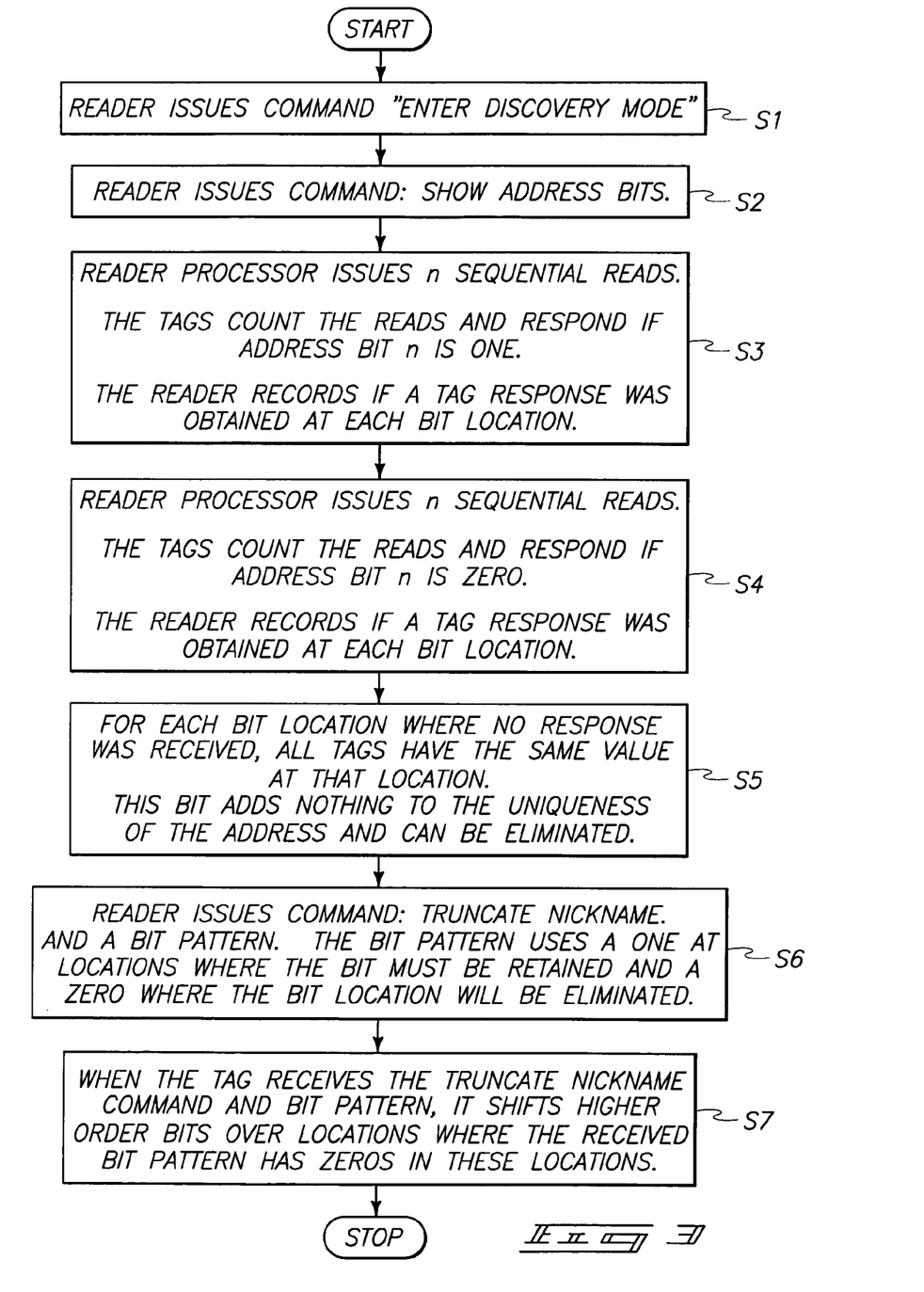
FIG. 3 is a flowchart illustrating steps performed by the tag and reader of FIG. 2

At step S1, the reader issues a command of "ENTER DISCOVERY MODE" with, in one embodiment, a session ID. This will cause all tags, which have not been discovered using the supplied session ID, to enter a discovery mode. This causes, in one embodiment, the tag's nickname to be set to the same value as their permanent ID number. In another embodiment, the tag's nickname is set later, after compression.

At step S2, the reader issues a "SHOW ADDRESS BITS" command. The tags keep track of which bit is being requested by the reader by counting timeslots. A timeslot is an interval controlled by the reader during which a tag responds. In one embodiment, a timeslot is, for example, an ON-OFF keyed broadcast period. If the tags are passive or semi-passive, the reader illuminates the tags with RF when expecting a response. Passive and semi-passive RFID tags can only communicate back to the reader when the tag is illuminated with RF.

The tags respond (e.g., with a TONE) for each bit of their respective NICKNAME numbers which is ONE, and the reader keeps track in step S3 of the timeslots where no response was received for any of the responding tags. Because the timeslots correspond to bit positions, for each bit where no response is received, all tags have the same value at that bit position.

This process is performed a second time in step S4. This time the tags respond for each bit of their NICKNAME which is ZERO. Again, the reader keeps track of the timeslots where no response is present. All of the bit positions that have the same value can be removed from the NICKNAME without any loss of uniqueness in the tag's ID.

In step S5, a bit pattern is generated which includes ZEROs in timeslot locations where no useful information is present. Referring to Example 1, below, step S5 is performed by taking the logical AND of the ONEs SYSTEM RESPONSE with the ZEROs SYSTEM RESPONSE to create the TRANSMITTED BIT PATTERN. Unless there is both a ONE response and a ZERO response for a particular bit location, all tags have the same value at that bit position. Thus, in step S5, the reader combines the results of steps S3 and S4.

In step S6, the reader sends a "TRUNCATE NICKNAME" command, along with a bit pattern (i.e.; the TRANSMITTED BIT PATTERN of Example 1), which identifies bits within the nickname which can be ignored.

In step S7, each tag participating in the current session removes these bits from the NICKNAME. The result is obtained by right shifting the Tag ID to remove empty bit locations. In one embodiment, two separate right shifts could occur, one for bit locations that contain all ZEROs and one for bit locations that contain all ONEs; however, in the illustrated embodiment, only one right shifting occurs for both ONEs and ZEROs for shorter transmission times. In Example 1, below, bits 0, 1, and 3 (where bits are numbered from right to left; i.e., from least significant bit to most significant bit) contain no useful information. So, the NICKNAME is modified (or a new NICKNAME is created) for each tag, in which those bits are eliminated. The ZEROs and ONEs NICKNAME column corresponds to the permanent Tag ID column with useless bits 0, 1, and 3 removed (bit 0 was all ONEs, bit 1 was all ZEROs, and bit 3 was all ZEROs). The new least significant bit of the ZEROs and ONEs NICKNAME corresponds to old bit 2, the second least significant bit corresponds to old bit 4, the third least significant bit corresponds to old bit 5, the fourth least significant bit of the NICKNAME corresponds to old bit 6, etc.

These steps are illustrated in Example 1, below, assuming only by way of example) tags having eight-bit IDs of 165, 81, 21, 97, and 209 (decimal), respectively. The tag and reader use a binary number system to represent numbers.

When the results of these five tags' responses are combined, the ONEs system response has a ONE in all positions, except BIT3 and BIT1, and the ZEROs response has no response at BIT0.

The bit pattern transmitted to the tags will be 11110100 since BIT0, BIT1, and BIT3 contain no useful information. See Example 1, above.

The tag's permanent ID will be compressed using 11110100 as the TRANSMITTED BIT PATTERN to form a NICKNAME without BIT3, BIT1, and BIT0. See Example 1, above.

Phase 1 NICKNAME creation is now complete. Assuming a 36-bit permanent Tag ID, the communication time required includes two reader commands, 72 TONE times (tag to reader—one for each bit repeated for true and inverted state), and finally commands from the reader to compress the ID numbers. Simulations were performed to test the extremes of this technique. One extreme is sequential Tag ID numbers. If there were 100 tags in the reader's field of view, the 36-bit permanent Tag ID could be reduced to a 7-bit NICKNAME depending on the ranges of sequential Tag ID numbers. But, if these sequentially numbered tags started at 3302153771, this technique would reduce the NICKNAME starting number to 43. This is a very significant compression, 24-bits. The table below shows sample starting sequences, the resulting NICKNAME starting value, and the resulting compression.

Phase 1 Compression of Sequential Tag ID numbers.

TABLE 1

| | Phase 1 Compression | |
|---|---|---|
| Tag ID Number | Nickname Starting ID | Bits Compressed |
| 127 | 127 | 0 |
| 131 | 3 | 5 |
| 255 | 255 | 0 |
| 257 | 1 | 8 |
| 999 | 999 | 0 |
| 4049 | 4049 | 0 |
| 13333 | 21 | 6 |
| 33021 | 253 | 7 |
| 33021537 | 97 | 17 |
| 330215377 | 4049 | 16 |
| 3302153771 | 43 | 24 |

EXAMPLE 1

| EXAMPLE 1. ID COMPRESSION PHASE 1 | | | | | | | | |
|---|---|---|---|---|---|---|---|---|
| Decimal Permanent Tag ID | Binary Permanent Tag ID | ONEs Respond | ZEROs Respond | ONEs System Response | ZEROs System Response | Transmitted Bit Pattern | ZEROs & ONEs Nickname | Final Nickname |
| 165 | 10100101 | 10100101 | 01011010 | 11110101 | 11111110 | 1110100 | 10101 | 21 |
| 81 | 1010001 | 1010001 | 0101110 | | | | 1010 | 10 |
| 21 | 10101 | 10101 | 01010 | | | | 11 | 3 |
| 97 | 1100001 | 1100001 | 0011110 | | | | 1100 | 12 |
| 209 | 11010001 | 11010001 | 00101110 | | | | 11010 | 26 |

Therefore, Tag ID 165 is the same as the binary number 10100101. (BIT0=1, BIT1=0, BIT2=1, BIT3=0, BIT4=0, BIT5=1, BIT6=0 and BIT7=1). Therefore, for step S3, at bit counts 0, 2, 5, and 7, the tag responds.

Continuing the example of Tag ID 165, at step S4 the tag responds at bit count 1, 3, 4 and 6.

The above shows the varying compression effects of the Phase 1 technique depending on the starting point of the sequential numbers. Reviewing the bit patterns of the ID numbers, the reason for minimal compression in some cases can be seen. For example if 100 tags starting with Tag ID number 999 was used the sequence starts with bit 9 being the most significant bit. At Tag ID number 1024 the most significant bit is 10, and many of the lower order bits are now used.

The other extreme is for random Tag ID numbers where simulations showed no compression would occur. The Phase 2 NICKNAME creation technique, which will next be described, has demonstrated reduced NICKNAME size in the case of random groups of permanent Tag ID numbers.

the value of Group0 is 101111 binary which equals 1×1+1×2+1×4+1×8+0×16+1×32 or 47 decimal).

The reader reviews the occupied values for each part of the nickname address space. The Phase 2 Compression Table below uses those tags with no Phase 1 compression and shows the occupied values under the columns deginning with "Original" below. Assume the tag numbers are divided into 4-bit sections.

TABLE 2

Phase 2 Compression

| Tag ID Number | Original Nibble 0 | Original Nibble 1 | Original Nibble 2 | Original Nibble 3 | Final Nibble 0 | Final Nibble 1 | Final Nibble 2 | Final Nibble 3 |
|---|---|---|---|---|---|---|---|---|
| 127 | 1111 | 0111 | 0 | 0 | 0000 | 1100 | 0 | 0 |
| 255 | 1111 | 1111 | 0 | 0 | 0000 | 1111 | 0 | 0 |
| 999 | 0111 | 1110 | 0011 | 0 | 0010 | 1110 | 0010 | 0 |
| 4049 | 0001 | 1101 | 1111 | 0 | 0001 | 1101 | 0001 | 0 |

The Phase 2 compression technique first identifies tags with NICKNAMES that have common groups of identical bit patterns. As long as the individual tags being discovered retain unique groups of bit patterns, it is acceptable to command all tags with that identical bit pattern to a new value. Illustration of this technique starts with a group of tags. Instead of the tags responding in bit sequence as in Phase 1, the tags are commanded to respond when the value of their most significant nibble is in the correct TIMESLOT. Simulations of random Tag ID number populations have shown duplication in each nibble. The reader then reassigns the identical nibbles to a sequential pattern. For a four-bit nibble, compression is possible if the Tag ID numbers can be reassigned to only occupy three bits. Simulations also showed that the number of tags being discovered has a direct effect on the potential compression, a larger group of tags requires more bits to achieve good compression. The steps involved in the Phase 2 compression (vertical compression) will now be described in connection with FIG. 4.

Figure 4:
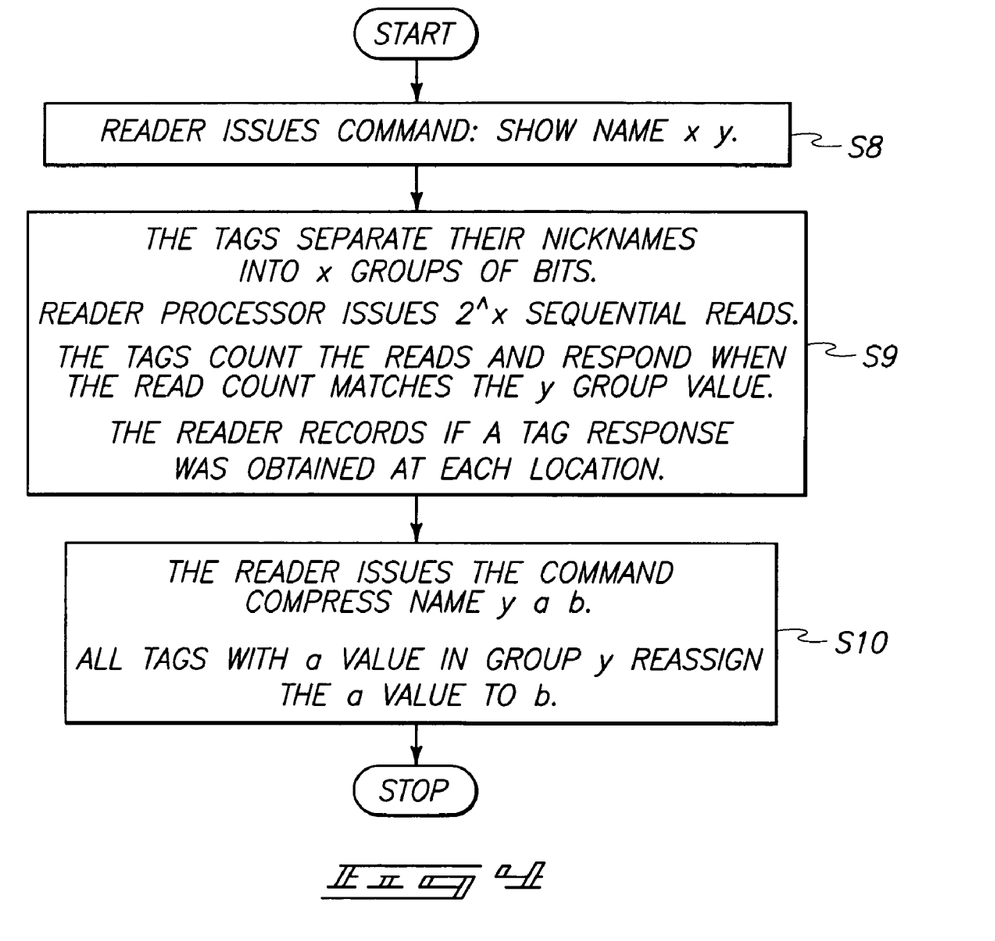
FIG. 4 is a flowchart illustrating steps performed by the tag and reader of FIG. 2 to achieve bit compression (first time term introduced) in accordance with another aspect of the invention.

In step S8, the reader issues a command "SHOW NAME x y" followed by a series of timeslots. The "x" value tells the tags how many bits are to be grouped together when the tags present the values of each part of their NICKNAME (e.g., nibbles or other length groups). The number of timeslots that will be generated depends on the value of "x"; e.g., 4 bits=16 timeslots and 6 bits=64 timeslots. The "y" value is the number of the group within the NICKNAME (e.g., 0 is the number of the least significant group of "x" bits).

In step S9, the tag presents a response (e.g., a TONE) at the timeslot corresponding to the value of the NICKNAME part. This value is presented as a single bit in the appropriate timeslot. If the command was, for example, SHOW NAME 4 0 and the value of the four bits of GROUP0 for the tag is 12 (decimal), the tag would issue a bit in the #12 timeslot.). Consider another example, a 16-bit tag with an ID of 43055 (decimal). The reader issues a command SHOW NAME 4 2. The tag separates its NICKNAME into groups of 4 bits. 43055 is the same as the binary number 1010100000101111. (Group0=1111, Group1=0010, Group2=1000, and Group3=1010). The reader will then issue 16 reads and this tag responds on the $8^{th}$ read (since the value of Group2 is 1000 binary which equals 8 decimal). If the command SHOW NAME 6 0 was issued, the read would issue 64 reads and this tag would respond on the 101111 ($47^{th}$) read (since If no response was received at a particular address, this address location is vacant and values within the group are not sequential for the responding tags. This location (value within the group) can be filled by reassigning a tag with another address to this location without losing Tag ID NICKNAME uniqueness.

At step S10, the reader issues a "COMPRESS NAME y a b" command for each received bit pattern. The "y" value is the group number, the "a" value is a received bit pattern, and the "b" value is the new bit pattern. Each tag with an "a" bit pattern in the "y" group, replaces the "a" bit pattern with the "b" bit pattern. This changes the tag's NICKNAME. The examples above show the new values under the columns beginning with "Final" above using the commands COMPRESS NAME 1, 7, 12; COMPRESS NAME 0, 15, 0; COMPRESS NAME 2, 3, 2; COMPRESS NAME 2, 15, 1 and COMPRESS NAME 0,7,2. If these changes were followed by Phase 1 compression, only six bits would remain (BIT0, BIT1, BIT4, BIT5, BIT8 and BIT 9).

The problem faced is how to quickly get, for example, the ID from 1000+ tags with 32-bit or more IDs. In one embodiment, reader tag communication rate is only 1000 bits/sec. It is desirable to be able to identify 1000 tags/sec. It is also desirable to overcome the collision problem resulting from multiple tags responding simultaneously. By using a controlled, but fast, method of reducing the ID range, a large number of tags can quickly be identified. Every bit reduced in the NICKNAME causes the range of IDs to be searched to be cut in half.

Phase 2 compression provides a way of reducing the Tag ID range by providing a method of grouping Tag IDs so we can get rid of additional bits. A particularly bad case for Phase 1 compression is two adjacent tags at IDs or IDs like 15 and 16, 31 and 32, 63 and 64, 127 and 128, 255 and 256, etc. If SHOW NAME 4 0 command is performed on any of these Tag IDs, responses are received at 0000 and 1111. 1111 can be changed, using the COMPRESS NAME command, to 0001. This allows a 3-bit ID compression.

The combination of Phase 1 and Phase 2 compression on the number 999 resulted in reducing the search range by a factor of 4 (from 10 bits to 8 bits). Performing Phase 1 and Phase 2 compression again will eliminate bit 7 for a total of 3 bits compression.

The reader then repeats the SHOW NICKNAME BITS/ TRUNCATE NICKNAME (Phase 1) process to remove identical bit values in the same location. In the example above, the column "Final Byte 1" always has its most significant bit equal to zero. If all tags deleted bit 7, the range of tags to be interrogated is reduced by a factor of two.

The reader can repeat the "SHOW NAME/COMPRESS NAME/SHOW NICKNAME BITS/TRUNCATE NICKNAME" process to continue to reduce the NICKNAME address length. Simulation tests have shown that larger groups of bit patterns used by the COMPRESS NAME process may take longer to obtain, but result in greater compression.

The randomness of the Tag ID numbers has a direct impact on the effectiveness of this technique. Therefore, it is suggested that this technique be performed twice followed by the next step.

When the NICKNAME field length is minimized, the reader issues a SHOW NICKNAME command which causes the tag either:

a. Reply with its NICKNAME in the corresponding TIME (and/or FREQUENCY) slot corresponding to its NICKNAME ID. This method is described in the above-incorporated, commonly assigned application.

b. Sequentially reply in the corresponding TIME (and/or FREQUENCY) slot corresponding to its NICKNAME ID. If the tags are scanned, for example, at a 1-kHz rate and the NICKNAME length has been reduced to 10 bits, this only takes one second using a single IF. Use of multiple IFs will proportionally reduce this time.

The NICKNAMES assigned during prior sessions can now be resolved with the NICKNAMES assigned during the present session.

Attention is directed towards the following examples.

EXAMPLE 2

| EXAMPLE 2. ID COMPRESSION PHASE 2 | | | |
|---|---|---|---|
| Decimal Permanent Tag ID | Binary Permanent Tag ID | Post-Phase 1 Binary Nickname | Post-Phase 1 Decimal Nickname |
| 4165 | 1000001000101 | 1000001001 | 521 |
| 4081 | 111111110001 | 111111110 | 510 |
| 4021 | 111110110101 | 111110111 | 503 |
| 4097 | 1000000000001 | 1000000000 | 512 |
| 4209 | 1000001110001 | 1000001110 | 526 |
| Phase 1 Mask 1111111110100 | | | |

| Post-Phase 1 Binary Nickname | Post-Phase 1 Decimal Nickname | Phase 2 Showname 4 1 Response | Compress Name 1 1111 0001 Results | Phase 2 Showname 4 2 Response | Compress Name 2 0010 0000 Results |
|---|---|---|---|---|---|
| 1000001001 | 521 | 0 | 0 | 10 | 0 |
| 111111110 | 510 | 1111 | 1 | 1 | 1 |
| 111110111 | 503 | 1111 | 1 | 1 | 1 |
| 1000000000 | 512 | 0 | 0 | 10 | 0 |
| 1000001110 | 526 | 0 | 0 | 10 | 0 |

| Post-Phase 2 Binary Nickname | Post-Phase 2 Decimal Nickname | Final Binary Nickname | Final Decimal Nickname |
|---|---|---|---|
| 000001001 | 9 | 1001 | 9 |
| 100011110 | 286 | 11110 | 62 |
| 100010111 | 279 | 10111 | 55 |
| 000000000 | 0 | 0 | 0 |
| 1110 | 14 | 1110 | 14 |
| Phase 1 Mask 100011111 | | | |

EXAMPLE 3

| EXAMPLE 3. ID COMPRESSION PHASE 2 | | | |
|---|---|---|---|
| Decimal Permanent Tag ID | Binary Permanent Tag ID | Post-Phase 1 Binary Nickname | Post-Phase 1 Decimal Nickname |
| 5165 | 1010000101101 | 10000101 | 133 |
| 5081 | 1001111011001 | 1111010 | 122 |
| 5021 | 1001110011101 | 1110011 | 115 |

-continued

| EXAMPLE 3. ID COMPRESSION PHASE 2 | | | |
|---|---|---|---|
| 5097 | 1001111101001 | 1111100 | 124 |
| 5209 | 1010001011001 | 10001010 | 138 |
| Phase 1 Mask 0011111110100 | | | |

| Post-Phase 1 Binary Nickname | Post-Phase 1 Decimal Nickname | Phase 2 Showname 4 0 Response | Phase 2 Showname 4 1 Response | Compress Name 2 1000 0110 Results |
|---|---|---|---|---|
| 10000101 | 133 | 0101 | 1000 | 110 |
| 1111010 | 122 | 1010 | 111 | 111 |
| 1110011 | 115 | 0011 | 111 | 111 |
| 1111100 | 124 | 1100 | 111 | 111 |
| 10001010 | 138 | 1010 | 1000 | 110 |

| Post-Phase 2 Binary Nickname | Post-Phase 2 Decimal Nickname | Final Binary Nickname | Final Decimal Nickname |
|---|---|---|---|
| 1100101 | 101 | 0101 | 5 |
| 1111010 | 122 | 11010 | 26 |
| 1110011 | 115 | 10011 | 19 |
| 1111100 | 124 | 11100 | 28 |
| 1101010 | 106 | 1010 | 10 |
| Phase 1 Mask 0011111 | | | |

| Decimal Permanent Tag ID | Binary Permanent Tag ID | Post-Phase 1 Binary Nickname | Post-Phase 1 Decimal Nickname |
|---|---|---|---|
| 65165 | 1111111010001101 | 11111110100011 | 16291 |
| 65081 | 1111111000111001 | 11111110001110 | 16270 |
| 65021 | 1111110111111101 | 11111101111111 | 16255 |
| 65097 | 1111111001001001 | 11111110010010 | 16274 |
| 66209 | 10000001010100001 | 100000010101000 | 16552 |
| Phase 1 Mask 11111111111111100 | | | |

| Post-Phase 1 Binary Nickname | Post-Phase 1 Decimal Nickname | Phase 2 Showname 5 2 Response | Compress Name 2 10000 1110 Results | Post-Compress Binary Nickname | New Binary Nickname |
|---|---|---|---|---|---|
| 11111110100011 | 16291 | 1111 | 1111 | 11111110100011 | 11110100011 |
| 11111110001110 | 16270 | 1111 | 1111 | 11111110001110 | 11110001110 |
| 11111110010010 | 16274 | 1111 | 1111 | 11111110010010 | 11110010010 |
| 100000010101000 | 16552 | 10000 | 1110 | 11100010101000 | 00010101000 |
| | | Phase 1 Mask 1110000000 | | | |

| Post-Phase 2 Binary Nickname | Phase 2 Showname 6 1 Response | Compress Name 1 00010 11100 Results | Post-Compress Binary Nickname | New Binary Nickname | New Decimal Nickname |
|---|---|---|---|---|---|
| 11110100011 | 11110 | 11110 | 11110100011 | 10100011 | 163 |
| 11110001110 | 11110 | 11110 | 11110001110 | 10001110 | 142 |
| 11101111111 | 11101 | 11101 | 11101111111 | 01111111 | 127 |
| 11110010010 | 11110 | 11110 | 11110010010 | 10010010 | 146 |
| 00010101000 | 00010 | 11100 | 11100101000 | 00101000 | 40 |
| | | Mask 11100000000 | | | |

In the embodiments shown in FIGS. 3 and 4 and described above, certain functions are performed by the tags and certain functions are performed by the reader. In alternative embodiments, different functions could be selected to be performed by the tags or by the readers. In certain embodiments, additional functions are performed by the reader instead of the tags. For example, instead of transmitting a bit pattern (mask) in step S6 of FIG. 3, masks could be maintained in the reader and the reader can maintain intelligence of which could be ignored (and step S7 can be eliminated). Moving intelligence from the tags to the reader results in lower tag processing overhead.

This method and apparatus has three significant advantages. The first is in reducing the amount of communication required to determine which tags are being discovered. The second is in allowing manufacturing companies the option of using long, unique Tag IDs. The reader does not need to know the tag's whole name, only a unique NICKNAME. The third advantage is that the tags have limited communication and computation capability and using a NICKNAME shortens the amount of communications required. The RFID market is an ideal market to use this technique. It is a very rapidly growing market that has the potential of becoming a major component of the location, identification, and inventory control market. The potential applications include those sensitive to rapidly identifying a large number RF tags in as short a period of time as possible. To better illustrate how the tags are envisioned for usage, the five main application areas that have been considered include: Inventory Management, Process Monitoring, Process Control, Diagnostics, and Security of which Inventor Management and Security applications are discussed.

Inventory management incorporates a wide variety of situations where RFID tags can be used. These situations include the simple inventory/locating task of critical or high-value items in storage, transport, or final use locations. Speeding up the process of identifying large numbers of tagged items greatly increases the speed at which the customer's inventory management system can operate.

The addition of authentication and encryption processes to the tags requires that long messages and tag identifiers be used. The described method and apparatus, that reduces the time to identify a given tag, will enhance system performance.

Thus, a system and method have been provided for rapidly identifying tags in a field. Collisions are also dramatically reduced as a result of using the method and apparatus of the preferred embodiment described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of rapidly identifying RFID tags in an RFID system including a reader and a plurality of RFID tags, the tags having respective IDs formed of a plurality of bits, bits within an ID having digit positions defining bit locations, the method comprising:
  determining in the reader which bit locations do not add to the uniqueness of the IDs of the tags; and
  instructing tags, using the reader, to compress their IDs by shifting over bit locations that do not add to the uniqueness of the IDs of the tags with respect to other tags in use with the reader.

2. A method of rapidly identifying RFID tags in an RFID system in accordance with claim 1 wherein the instructing comprises instructing tags, using the reader, to compress their IDs by right shifting over bit locations that do not add to the uniqueness of the IDs of the tags.

3. A method of rapidly identifying RFID tags in an RFID system in accordance with claim 1 wherein the instructing comprises:
  (a) issuing from a reader a number n of sequential reads;
  (b) respective tags counting the reads and responding if bit n of their ID has a first value;
  (c) recording with the reader, bit locations at which a response was obtained;
  (d) issuing from the reader a number n of sequential reads;
  (e) respective tags counting the reads and responding if bit n of their ID has a second value different from the first value;
  (f) recording, with the reader, bit locations at which a response was obtained; and
  (g) determining, with the reader, bit locations at which a response was received for both (c) and (f).

4. A method of compressing IDs of tags in an RFID system including a reader and a plurality of tags, different tags having different IDs, the IDs having a plurality of bits, the method comprising:
  (a) issuing from a reader a number n of sequential reads;
  (b) respective tags counting the reads and responding if bit n of their ID has a first value;
  (c) recording with the reader, bit locations at which a response was obtained;
  (d) issuing from the reader a number m of sequential reads;
  (e) respective tags counting the reads and responding if bit m of their ID has a second value different from the first value;
  (f) recording, with the reader, bit locations at which a response was obtained;
  (g) determining, with the reader, bit locations at which a response was received for both (c) and (f); and
  (h) sending a command from the reader to the tags to modify their IDs by shifting over bit locations other than those determined in (g).

5. A method of compressing IDs of tags in an RFID system in accordance with claim 4 wherein the first value is a binary one.

6. A method of compressing IDs of tags in an RFID system in accordance with claim 4 wherein, in response to (h), the tags modify their IDs by shifting right over bit locations other than those determined in (g).

7. A method of compressing IDs of tags in an RFID system in accordance with claim 4 wherein, when a tag responds, it responds at a frequency that is unique relative to the frequencies of the other tags and wherein the reader distinguishes between tags based on the frequency of the response.

8. A method of compressing IDs of tags in an RFID system in accordance with claim 4 wherein, when a tag responds, it responds using a frequency pattern that is unique relative to the frequency patterns used by the other tags and wherein the reader distinguishes between tags based on the frequency pattern of the response.

9. A method of compressing IDs of tags in an RFID system in accordance with claim 4 wherein the tags respond to the reader using backscatter.

10. A method of rapidly identifying RFID tags in an RFID system including a reader and a plurality of RFID tags, the tags having respective IDs formed of a plurality of bit locations, the method comprising:
  (a) issuing from a reader a command indicating a group number y corresponding to a group of bits in the respective tags IDs, followed by a number of timeslots;
  (b) respective tags counting the timeslots and responding in a timeslot corresponding to decimal equivalent of the value contained in group number y;
  (c) recording with the reader, the responses; and
  (d) issuing from the reader, commands requesting certain tags to change the values located in their group number y.

11. A method of compressing IDs of tags in an RFID system in accordance with claim 10 wherein (d) is performed so as to make the values of group y of multiple tags more sequential.

12. A method of compressing IDs of tags in an RFID system in accordance with claim 10 wherein (d) is performed so as to attempt to reduce the number of bits necessary to maintain the same number of unique values within group y.

13. A method of compressing IDs of tags in an RFID system in accordance with claim 10 wherein (d) comprises determining if multiple tags have identical values for group y and, if so, changing those identical values.

14. A method of compressing IDs of tags in an RFID system in accordance with claim 10 wherein (d) comprises determining if multiple tags have identical values for group y and, if so, changing those identical values to new identical values having a smaller number of bits.

15. A method of compressing IDs of tags in an RFID system in accordance with claim 10 wherein (d) comprises determining if multiple tags have identical values for group y that use more bits than group y values of other tags and, if so, changing those identical values.

16. A method of compressing IDs of tags in an RFID system in accordance with claim 10 and further comprising, after (d), the following:
   (e) issuing from a reader a number n of sequential reads;
   (f) respective tags counting the reads and responding if bit n of their ID has a first value;
   (g) recording with the reader, bit locations at which a response was obtained;
   (h) issuing from the reader a number m of sequential reads;
   (i) respective tags counting the reads and responding if bit m of their ID has a second value different from the first value;
   (j) recording, with the reader, bit locations at which a response was obtained;
   (k) determining, with the reader, bit locations at which a response was received for both (g) and (j); and
   (l) sending a command from the reader to the tags to modify their IDs by shifting over bit locations other than those determined in (k).

17. A method of compressing IDs of tags in an RFID system in accordance with claim 16 wherein (a) through (l) are repeated for different y values.

18. A method of compressing IDs of tags in an RFID system in accordance with claim 10 wherein (b) comprises tags responding with a tone at a timeslot corresponding to the decimal equivalent of the value contained in group y.

19. A method of compressing IDs of tags in an RFID system in accordance with claim 10 wherein (a) through (d) are repeated for different y values.

20. An RFID system comprising:
   a plurality of RFID tags, the tags having respective IDs formed of a plurality of bits, bits within an ID having digit positions defining bit locations; and
   an RFID reader configured to communicate with the RFID tags, the reader being configured to instruct tags to compress their IDs by shifting over bit locations that do not add to the uniqueness of the IDs of the tags with respect to other tags in use with the reader.

21. An RFID system in accordance with claim 20 wherein the reader is configured to instruct tags to compress their IDs by right shifting over bit locations that do not add to the uniqueness of the IDs of the tags.

22. An RFID system in accordance with claim 20 wherein the reader is further configured to:
   (a) issue a number n of sequential reads, during which respective tags count the reads and respond if bit n of their ID has a first value;
   (b) record bit locations at which a response was obtained;
   (c) issue a number m of sequential reads during which respective tags count the reads and respond if bit m of their ID has a second value different from the first value;
   (d) record bit locations at which a response was obtained; and
   (e) determine bit locations at which a response was received for both (b) and (d).

23. An RFID system comprising:
   a plurality of RFID tags, the tags having respective IDs formed of a plurality of bit locations; and
   an RFID reader configured to communicate with the RFID tags, the reader being configured to:
   (a) issue a number n of sequential reads;
   (b) record bit locations at which a response was obtained;
   (c) issue a number m of sequential reads;
   (d) record bit locations at which a response was obtained; and
   (e) determine bit locations at which a response was received for both (b) and (d); and
   the tags being configured to, during (a), count the reads and respond if bit n of their ID has a first value and configured to, during (c), count the reads and respond if bit m of their ID has a second value different from the first value.

24. An RFID system in accordance with claim 23 wherein the first value is a binary one.

25. An RFID system in accordance with claim 23 wherein, in response to a command from the reader, the tags modify their IDs by shifting right over bit locations other than those determined in (e).

26. An RFID system in accordance with claim 23 wherein the tags are configured such that when a tag responds to the reader, it responds at a frequency that is unique relative to the frequencies of the other tags, and wherein the reader is configured to distinguish between tags based on the frequency of the response.

27. An RFID system in accordance with claim 23 wherein the tags are configured such that when a tag responds to the reader, it responds using a frequency pattern that is unique relative to the frequency patterns used by the other tags, and wherein the reader is configured to distinguish between tags based on the frequency pattern of the response.

28. An RFID system in accordance with claim 23 wherein the tags are configured to respond to the reader using backscatter.

29. An RFID system comprising:
   a plurality of RFID tags, the tags having respective IDs formed of a plurality of bit locations; and
   a reader configured to communicate with the tags and configured to issue a command indicating a group number y corresponding to a group of bits in the respective tags IDs, followed by a number of timeslots;
   the tags being configured to count the timeslots and respond in a timeslot corresponding to decimal equivalent of the value contained in group number y; and
   the reader being further configured to record the responses; and
   issue commands requesting certain tags to change the values located in their group number y.

30. An RFID system in accordance with claim 29 wherein the reader is configured to issue commands requesting certain tags to change the values so as to make the values of group y of multiple tags more sequential.

31. An RFID system in accordance with claim 29 wherein the reader is configured to issue commands requesting certain tags to change the values so as to attempt to reduce the number of bits necessary to maintain the same number of unique values within group y.

32. An RFID system in accordance with claim 29 wherein the reader is configured to determine if multiple tags have identical values for group y and, if so, to issue a command to cause the tags to change those identical values.

33. An RFID system in accordance with claim 29 wherein the reader is configured to determine if multiple tags have identical values for group y and, if so, to issue a command to cause the tags to change those identical values to new identical values having a smaller number of bits.

34. An RFID system in accordance with claim 29 wherein the reader is configured to determine if multiple tags have identical values for group y that use more bits than group y values of other tags and, if so, to issue a command to cause the tags to change those identical values.

35. An RFID system in accordance with claim 29 wherein the reader is further configured to:
 (a) issue a number n of sequential reads;
 (b) record bit locations at which a response was obtained;
 (c) issue a number n of sequential reads;
 (d) record bit locations at which a response was obtained;
 (e) determine bit locations at which a response was received for both (b) and (d); and
 (f) send a command from the reader to the tags to modify their IDs by shifting over bit locations other than those determined in (e); and
the tags being configured to:
 in response to (a), count the reads and respond if bit n of their ID has a first value; and p1 in response to (c), count the reads and respond if bit n of their ID has a second value different from the first value.

36. An RFID system in accordance with claim 35 wherein (a) through (f) are repeated for different y values.

37. An RFID system in accordance with claim 29 the tags are configured to count the timeslots and respond with a tone in a timeslot corresponding to decimal equivalent of the value contained in group number y.

38. An RFID system in accordance with claim 29 wherein the reader is configured to issue a command indicating a group number y corresponding to a group of bits in the respective tags IDs, followed by a number of timeslots, to record the responses; and to issue commands requesting certain tags to change the values located in their group number, for multiple different y values.

39. An RFID system comprising:
 a plurality of RFID tags, the tags having respective IDs formed of a plurality of digits, digits within an ID having digit positions; and
 an RFID reader configured to communicate with the RFID tags, the reader being configured to instruct tags to compress their IDs by shifting over digit locations that do not add to the uniqueness of the IDs of the tags with respect to other tags in use with the reader.

40. An RFID system in accordance with claim 39 wherein the reader is configured to instruct tags to compress their IDs by right shifting over digit locations that do not add to the uniqueness of the IDs of the tags.

* * * * *

UNITED STATES PATENT AND TRADEMARK OFFICE
CERTIFICATE OF CORRECTION

PATENT NO. : 7,009,526 B2
APPLICATION NO. : 10/263873
DATED : March 7, 2006
INVENTOR(S) : Hughes et al.

It is certified that error appears in the above-identified patent and that said Letters Patent is hereby corrected as shown below:

Page 2, second column, please insert --U.S. Patent Appn. filed 10/2/2002, entitled "Wireless Communications Systems, Radio Frequency Identification Devices, Wireless Communications Methods, and Radio Frequency Identification Device Communications Methods", by Richard M. Pratt and Steven B. Thompson, Attorney Docket No. 13252-B (BA4-101)-- before "PCT/US03/26218,".

Col. 2, line 51, please delete "timing pulses" after "timing pulses".

Col. 10, line 6, please delete "deginning" after "columns" and insert --beginning--.

Col. 12, EXAMPLE 2, line 4, please insert --1-- after "Post-Phase".

Cols. 13-14, EXAMPLE 3, line 49, please insert --111111101111111   16255   1111   1111   111111101111111   11101111111-- after "11110001110".

Cols. 13-14, EXAMPLE 3, line 51, please delete "1110000000" after "Phase 1 Mask" and insert --11100000000000--.

Col. 13, line 65, please insert --bits-- after "which".

Col. 15, line 1, please insert --of-- after "number".

Col. 19, line 26, claim 35, please delete "p1" after "and".

Signed and Sealed this

Seventh Day of July, 2009

JOHN DOLL
*Acting Director of the United States Patent and Trademark Office*